Patented Dec. 20, 1949

2,492,038

UNITED STATES PATENT OFFICE 2,492,038

DISTILLATION OF HYDROCARBONS FROM AQUEOUS RESIN ACID SOAP SOLUTIONS

Frederick H. Gayer, Chicago, Ill., assignor to Continental Research Corp., Chicago Heights, Ill., a corporation of Illinois No Drawing. Application May 3, 1947, Serial No. 745,722

8 Claims. (Cl. 202—57)

The present invention relates to a novel method for the recovery of alkali resinate from resin acid soap solutions which have been subjected to solvent extraction. Such soap solutions always retain a portion of the extracting solvent, the removal of which is necessary from the standpoint of solvent economy as well as that of the industrial usefulness of the soap solution. Removal of the solvent by distillation is not feasible due to the strong foaming tendency of the soap solution.

It is an object of the present application to provide a method by which foaming of the soap solution is prevented, thereby making smooth distillation of the solvent possible.

The soap solutions serving as starting materials for the present process are obtained as a result of the separation of neutral matter from resin acids. The neutral matter in resin acids which have not been subjected to a drastic saponification consists of unsaponifiable (hydrocarbons, higher alcohols) and unsaponified (esters, lactones) compounds. The general method for effecting such a separation consists of neutralizing the resin acids with an aqueous alkali metal base, preferably sodium hydroxide, and extracting the neutral matter with a water-immiscible solvent, such as a hydrocarbon solvent. For example, the resin acids in rosin can be neutralized and the neutral matter extracted, resulting in a higher acid number and melting point of the recovered resin acids as compared with the original rosin. The resin acid soap solution resulting from this extraction is one example of a suitable starting material for the present process. Another example is furnished by the resin acid soap solution originating from the separation of tall oil into its main components, namely fatty and resin acids. A group of processes effecting such separation is based on transforming the fatty acids into neutral compounds, such as esters, neutralizing the resin acids and solvent extracting the fatty acid fraction together with neutral bodies originally present in tall oil. Still another example is the resin acid soap solution of non-abietic type resin acids which result from the separation of rosin or tall oil resin acids into an abietic and non-abietic acid fraction in accordance with my co-pending applications, Serial Nos. 745,721 and 745,723, the latter fraction containing a high proportion of neutral matter which is removed by extraction.

The resin acid soap solutions issuing from the extraction step as raffinates are largely free of neutral matter and are substantially composed of water, sodium resinate and extracting solvent. The proportion of these components may vary within wide limits, depending on the conditions under which the extraction was made.

The resin acid soap raffinates as they emerge from the extraction step are not suitable for commercial use since the presence of solvent is highly objectionable in most industrial applications and the high water content would make the cost of transportation prohibitive. Complete removal of the solvent and of a portion of the water from the raffinate by distillation is not possible due to the strong foaming which sets in as soon as a portion of the solvent has distilled. Therefore, the prior art proposes the complete decomposition of the extracted alkali resinate solutions with mineral acid, thereby recovering the solvent which is returned to the extraction cycle, and obtaining free resin acids which can be used to replace rosin.

Complete decomposition of the resin acid soap has several disadvantages. As a processing step it is, due to the excess of mineral acid and the type of equipment required, highly unsatisfactory. In addition, it involves a waste of acid and alakli if, as in many industrial applications, the resulting resin acids are to be used for making sodium resinate. According to the present invention the disadvantages accompanying a complete decomposition of the resin acid soap can be avoided and a solvent-free sodium resinate solution of low water content can be produced by a simple and inexpensive method.

The present invention is briefly illustrated as follows: On heating resin acid soap raffinates in a still a portion of the solvent will distill smoothly until a critical point is reached where sudden foaming sets in. From this point on further distillation is not feasible. I have now found that on adding a strong salt solution to the still contents, foaming is somewhat but not sufficiently decreased. I have further found that the smoothness of the distillation can be considerably and satisfactorily increased if, besides adding salt, I also decompose a minor portion of the soap with an acidic material. That is, as a characterizing feature of the present invention I have found that neither of these effects alone, i. e. neither the presence of free resin acids, nor creating a high salt concentration exerts in itself an effect strong enough to prevent foaming. However, foaming is effectively prevented by a combination of free acidity and a high salt concentration.

Briefly, then, the present invention requires partial decomposition of the soap contained in the resin acid soap raffinate and distilling off the solvent in the presence of a considerable amount of salt.

The advantages of the process just outlined as compared with complete decomposition of the soap are obvious. By decomposing only a portion of the soap the necessity for an excess of corrosive mineral acid is avoided and a considerable economy in the consumption of acid and alkali effected, provided that sodium resinate and not free resin acids are the desired product.

Treatment of the raffinates according to the present invention comprises decomposing a definite proportion of the soap, creating a regulated salt concentration and distilling until the solvent is completely removed. It will be recognized that, due to the presence of water, the distillation taking place is actually a steam distillation which proceeds at a temperature somewhat below the boiling point of water. The distillate consists of solvent and water in changing proportions, the solvent greatly predominating at first. Care must be taken as to the quantity of water removed. If not enough water is present in the starting material to furnish steam for the complete distillation of the solvent, a portion or even all of the water distilled with the solvent is continually returned to the still, not only to facilitate complete removal of the solvent but also to keep the salt in solution and retain the partially decomposed soap in the liquid state. Depending on the quantity of salt solution present, there may or may not take place a separation of the still contents into two layers. Such separation always takes place when the proportion of salt solution to soap is high enough to form a separate salt layer, the other layer being furnished by the highly concentrated, partially decomposed and salted out soap. According to the gravity of the salt solution, the strength of which may vary within certain limits, the salt solution forms either the upper or the lower layer. In most cases it will be of advantage to separate the salt solution from the soap layer before further processing the latter. If, due to the small quantity of salt solution present after removing the solvent, no separation of layers takes place, then the total still residue will enter subsequent processing steps.

The important factors entering the present process are: (1) The degree of the decomposition of the soap, or the proportion of free resin acids in the soap, and (2) the salt concentration.

In order to adjust the proportion of free resin acids, the total resin acid and total alkali content of the soap solution serving as starting material have to be determined. The soap solutions entering the present process may contain a small excess of alkali over that required for the neutralization of the resin acids, or they may be short of alkali and contain some of the resin acids in the free state. Whichever may be the case, the proportion of free resin acids eventually to be present is always related to the total resin acid content. For example, if for the distillation of the solvent it is desirable to have 35% of the resin acids in the free state and the analysis showed the soap solution to contain 5% excess or free alkali, it is obviously necessary to neutralize the alkali first and then decompose 35% of the soap present. In such case, the acidic material used for decomposition has to be equivalent to 40% of the total resin acids present. If, on the other hand, the soap solution serving as starting material contains 10% free resin acids and 90% resin acid soap, decomposing acid equivalent to only 25% of the total resin acids will be required. Should a resin acid soap raffinate be available the free resin content of which is 35% at the outset, then, clearly no added decomposition would have to be effected in order to process the raffinate. In general, however, the raffinates coming from the extractors are substantially neutral or nearly so.

I have found that the amount of free resin acids which, in combination with the salt present, improves the distilling qualities of the soap solution by preventing foaming, ranges from approximately 10% to about 45% of the total resin acids present. Below 10% foaming is not effectively prevented even if the salt concentration is high, and above 45% the resin acids liberated in soap solutions containing abietic acid, have a tendency to crystallize as soon as the solvent is removed which makes further processing difficult. Since saving of acid and alkali is an important object of the present invention, the degree of decomposition should not be higher than necessary for the distillation of the solvent without foaming. My preferred proportion of free resin acids ranges from 20 to 35%. Sulphuric acid is the preferred acid used for decomposing soap. Acid salts, such as sodium bisulphate, and other mineral acids, such as hydrochloric acid can be used.

The salt concentration which, in combination with the free acidity reduces the foaming tendency of the soap solution, ranges from approximately 5 to 20% by weight, as related to the combined weight of salt and water present. For example, if 100 parts by weight of a raffinate contain 40 parts of water and 10 parts of salt are present, the resulting salt concentration will be $10 \times 100/40 + 10 = 20\%$. The salt present not only reduces the foaming of the soap but, after removal of the solvent, may also cause salting out of the partially decomposed soap, as mentioned before. Such salting out causes separation of the solvent free soap into two layers and makes the separation of the major portion of the salt and of a large portion of the water from the soap layer possible. The salts most likely to be used in the present process are sodium sulphate and sodium chloride. Somewhat lower concentrations of the latter are required as compared with sodium sulphate to obtain the same result. The salt concentration required by the present process may be made up in part by the salt formed from the decomposition reaction of the resin acid soap with the acidic material and in part by the salt added either in the solid form or as a strong solution. Both decomposition and adding salt can be effected simultaneously by using for decomposition an acid salt like sodium bisulphate. A salt concentration satisfying the limits disclosed herein also can be obtained with the salt formed by decomposition alone when first a portion of the water is allowed to distill with the solvent, thereby increasing the salt concentration in the still contents. The water distilling after the desired salt concentration has been reached, is then returned to the still to keep the salt concentration constant. Generally, however, the desired salt concentration is established right in the beginning and kept constant during the distillation by a continuous and automatic return of the distilled water into the still. This makes control of the operation easy and insures the presence of sufficient water in the still to furnish steam for the distillation of the solvent and for keeping the still contents liquid. The salt concentration at any moment can be easily calculated from the quantity of water present (which is the sum of the water introduced with the raffinate, the decomposing acid and the salt solution, minus the water distilled), and the quantity of salt present (which is the sum of the salt formed by the decomposition and the salt added).

Further processing of the recovered acid soap can take several forms according to the use for which the sodium resinate is intended. It can be diluted and used as paper size, in which application the presence of some free resin acids is generally desirable. Or it can be transformed into a neutral soap by reacting it with the requisite amount of alkali. In another application, the solvent free soap obtained according to the present invention and originating from rosin or tall oil resin acids, can serve either in the partially decomposed or in the neutralized form as a starting material for the recovery of the abietic acid portion according to my aforementioned co-pending applications.

The following examples illustrate the present process in all its important phases but are in no way intended to limit the scope of the present invention.

Example 1

One hundred grams N wood rosin, acid number 163, were neutralized with sodium hydroxide, the resin acid concentration regulated to above 30% and to neutral matter extracted with naphtha.

The soap raffinate weighed 313 grams and had the following composition: sodium resinate 31%, water 43.1% and solvent 25.9%. In order to remove the solvent, the raffinate was charged into a still, 11.1 cc. of 8.1 N sulphuric acid was added to decompose 30% of the soap, and the salt concentration adjusted to 10% by adding 9.7 grams solid sodium sulphate. Distillation was smooth, the distilled water was continuously returned to the still. Distillate: 79 grams naphtha. The still residue consisted of a sodium sulphate solution as lower layer and 134 grams salted out acid soap layer of the composition: sodium acid resinate 68.0%, water 28.8%, sodium sulphate 3.2%.

Example 2

Five hundred grams raffinate, resulting from tall oil separation according to the process of Patent 2,348,970, and of the composition: sodium resinate 26.2%, water 44.0% and solvent 29.8%, were treated with 31.0 cc. of 4.56 N sodium bisulphate solution to cause a decomposition of 35% of the sodium resinate. This caused a salt concentration of 9.9%. To increase the salt concentration to 15%, 16 grams of solid sodium sulphate were added. The solvent was now distilled and the water distilling with the solvent continuously returned to the still. After removal of the solvent and draining of the salt layer from the still 191 grams salted out soap were obtained which had the composition: sodium acid resinate 64.5%, water 30.3%, sodium sulphate 5.3%.

Example 3

Five hundred grams raffinate, resulting from a tall oil separation according to the process of Patent 2,348,970, and of the composition: sodium resinate 31.8%, water 41.0% and solvent 27.2%, were reacted with 16.2 cc. of 10.6 N sulphuric acid to liberate 35% of the resin acids contained in the soap. In order to make the latter stage of the distillation possible without foaming, the salt concentration was raised to 9.5% by removing from the still 100 cc. water distilling over with the solvent. From this point on the salt concentration was kept constant through a continuous return to the still of the water distilling thereafter. After removal of the solvent, the still residue weighed 284 grams and had the following composition: sodium acid resinate 54.9%, water 40.8%, sodium sulphate 4.3%.

Example 4

A mixture of non-abietic type resin acids and neutral matter obtained from isomerized N wood rosin according to my co-pending applications, Serial Nos. 745,721 and 745,723, and having an acid number of 136, was neutralized with sodium hydroxide and the neutral matter exhaustively extracted with naphtha. The resulting resin acid soap raffinate had the following composition: sodium resinate 26.2%, water 42.8%, solvent 31.0%.

To 100 grams of the raffinate 2.0 cc. of 8.1 N sulphuric acid and 6.6 grams sodium sulphate were added whereby 20% of the sodium resinate was decomposed and a salt concentration of 15% created. The solvent was now distilled without foaming, the distilled water returned to the still. The salted out soap, forming the upper layer in the still, weighed 38 grams and had the following composition: sodium acid resinate 66.0%, water 28.9%, sodium sulphate 5.1%.

I claim as my invention:

1. The method of smoothly distilling hydrocarbon solvent from aqueous resin acid soap solutions containing said solvent which comprises, conducting said distillation with said solution in a condition of from 10% to 45% free resin acid content by weight of total resin acid material present and in the presence of alkali metal salt forming a 5% to 20% by weight salt solution with the water present.

2. The method of smoothly distilling residual solvent from a resin acid soap solution raffinate, said solution including water, alkali resinate and hydrocarbon extracting solvent, which comprises conducting said distillation with from 10% to 45% of the resin acid content of said solution in the free state and in the presence of alkali metal salt forming a 5% to 20% by weight salt solution with the water present while maintaining the aqueous content of solution adequate to retain the soap content thereof in liquid condition and the salt content thereof at said concentration.

3. The method for recovering sodium resinate from an aqueous resin acid soap solution which has been subjected to hydrocarbon solvent extraction, and for smoothly distilling residual solvent therefrom, which comprises decomposing from 10% to 45% of the resin acid content of said soap to the free state, adding salt thereto to provide a 5% to 20% by weight alkali metal salt solution with the water present, distilling the solvent from the solution while maintaining the aqueous content thereof adequate to retain the soap in solution and the salt content at said concentration, and recovering the resin acid material from the residue.

4. The process of claim 3 wherein the resin acid material is recovered from said residue as a separate concentrated salted out partially decomposed soap layer.

5. The method for recovering sodium resinate from an aqueous resin acid soap solution which has been subjected to hydrocarbon solvent extraction, and for smoothly distilling residual solvent therefrom, which comprises decomposing from 20% to 35% of the resin acid content of said soap to the free state, adding salt thereto to provide a 5% to 20% by weight alkali metal salt solution with the water present, distilling the solvent from the solution while maintaining the aqueous content thereof adequate to retain the soap in solution and the salt content at said concentration by continuously returning water distillate, and recovering the resin acid material from the residue.

6. The process of claim 5 wherein the resin acid material is recovered from said residue as a separate concentrated salted out partially decomposed soap layer.

7. The method for recovering sodium resinate from an aqueous solution thereof which has been subjected to extraction with a water immiscible solvent for separation of contained neutral bodies, and for smoothly distilling residual solvent therefrom, which comprises reacting said solution with an inorganic acidic material to provide a free resin acid content of 10% to 45% by weight of total resin acid material present and a 5% to 20% by weight salt solution with the water present, and distilling the solvent from the solution while maintaining the aqueous content thereof adequate to retain said salt concentration.

8. The method for recovering sodium resinate from an aqueous solution thereof which has been subjected to extraction with a water immiscible solvent for separation of contained neutral bodies, and for smoothly distilling residual solvent therefrom, which comprises reacting said solution with an inorganic acidic material to provide a free resin acid content of 10% to 45% by weight of total resin acid material present, partially distilling water and solvent from the solution until the remaining water has a 5% to 20% content by weight of salt formed in the process, and thereafter distilling off remaining solvent while returning water distillate to retain said salt concentration.

FREDERICK H. GAYER.

No references cited.